UNITED STATES PATENT OFFICE.

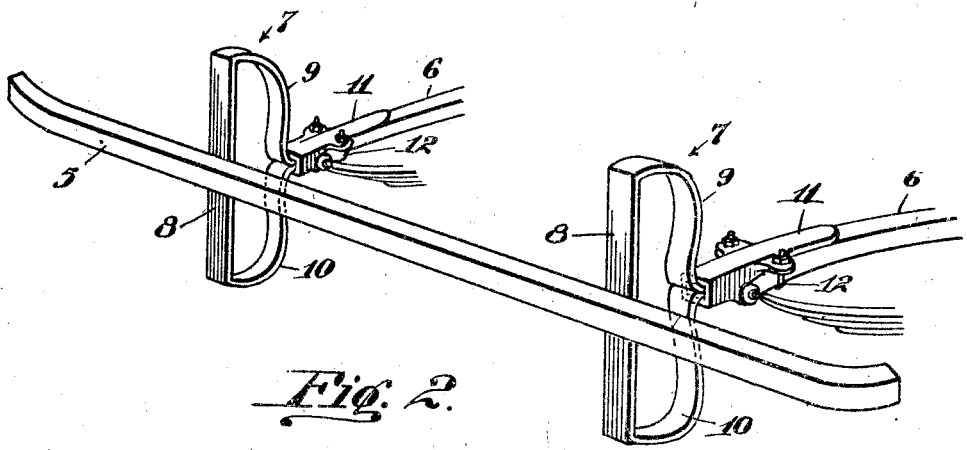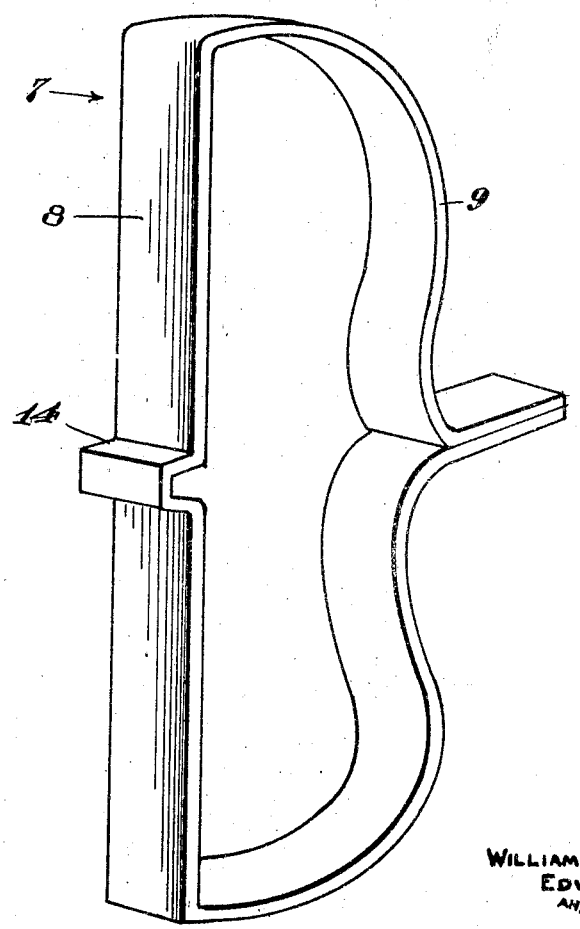

WILLIAM HENRY BOVARD, EDWARD LAWTON BARKER, AND CHARLES S. JENKINS, OF LOS ANGELES, CALIFORNIA; SAID BARKER ASSIGNOR TO SAID BOVARD AND SAID JENKINS.

BUMPER BRACKET.

1,407,835.      Specification of Letters Patent.      Patented Feb. 28, 1922.

Application filed January 27, 1920. Serial No. 354,339.

*To all whom it may concern:*

Be it known that we, WILLIAM HENRY BOVARD, EDWARD LAWTON BARKER, and CHARLES S. JENKINS, citizens of the United States, residing at Los Angeles, in the county of Los Angeles and State of California, have invented new and useful Improvements in Bumper Brackets, of which the following is a specification.

This invention relates to a bumper and particularly pertains to that class of bumpers commonly employed on auto-vehicles and the like.

Bumpers of this type usually comprise a horizontally arranged bumper bar and a mounting therefor by which the bar is disposed to extend transversely of the vehicle; a bumper bar being usually positioned both at the front and rear ends of the vehicles. Such bumper bars, while affording protection to the vehicle against obstructions disposed directly in the path of the bumper, are frequently ineffectual in preventing projections from passing either above or below the bumper, and particularly in the case of bumpers carried on other vehicles not arranged on the same plane. For example, where a vehicle is provided with a forward bumper that is positioned either above or below the rear bumper on a preceding vehicle, one of the bumpers might pass the other as in backing the forward vehicle so as to injure the fenders, lamps, or other parts of either vehicle located rearward of the bumper, such injuries being frequent where auto-vehicles are parked in line lengthwise of a curb and usually occur when backing the vehicle against one stationed in the rear thereof.

It is the object of this invention to provide a construction in bumpers of the above character by means of which vertically extending guards are so arranged in relation to the horizontal bumper bar as to afford a protection against the passage of bumper bars on other vehicles and similar transverse projections above or below the bumper bar, thereby overcoming the objection to the ordinary bumper construction above stated.

Another object is to provide a support for a bumper bar, embodying vertical guards and a further object is to provide a combined support and guard which affords a resilient support for the bumper bar whereby ordinary shocks on the latter will be absorbed.

Another object is to provide a device of the above character which is simple in construction and adapted to be readily attached to the types of bumper bars now generally in use and affixed to the vehicle.

Other objects will appear hereinafter.

The invention is illustrated in the accompanying drawings, in which:

Figure 1 is a perspective view illustrating a bumper as constructed and mounted in accordance with this invention.

Figure 2 is a detail perspective view illustrating the preferred construction of the combined bumper bar support and vertical guard.

More specifically, 5 indicates an ordinary bumper bar which is preferably formed with a channel cross section but may be of any suitable form, and 6 indicates spaced members of a vehicle on which the bumper bar is adapted to be supported and which ordinarily comprise the ends of the vehicle side frame. The present invention is embodied in a bracket 7 combined with the bumper bar by means of which the latter is connected to a member 6 and yieldably supported in a horizontally extending position and whereby vertical guards are formed to project above and below the bumper bar. This bracket comprises a metallic strip formed with an intermediate guard portion 8 adapted to be affixed to the horizontal bumper bar and to project vertically from the upper and lower sides thereof. The end portions of the strip are bent rearwardly and curved toward each other to form resilient supporting members 9 and 10 adapted to be attached at their terminals to the member 6 with the member 9 projecting upwardly from the member 6 and the member 10 projecting downwardly therefrom.

Any suitable means may be provided for attaching the resilient supporting members 9 and 10 to the member 6 but is here shown as comprising a shoe 11 to which the ends of the members 9 and 10 are secured and which shoe is fastened to the member 6 by a U-bolt 12 and may constitute the connection ordinarily employed in mounting bumper bars on auto-vehicles. As a means for effecting a substantial connection between the vertical guard portion 8 of the strip and the bumper bar where the latter is of channel cross section, this portion 8 is formed with a U-flange 14 intermediate its ends, which flange is constructed by bending the strip outwardly and returning it upon itself so as to form a transverse projection across the portion 8 adapted to extend into the longitudinal channel on the rear face of the bumper bar to which the U-flange may be secured in any desired manner. Where the bumper bar is of other shape in cross section, as for example of I-section or flat, the guard may be formed in a suitable manner to afford a substantial connection with the bar.

The spring members 9 and 10 connect with the upper and lower extremities of the vertical guard portion at substantially right angles thereto and extend toward each other in such spaced relation to the vertical guard portion rearward thereof to permit the latter to have movement toward or away from the member 6, with which the ends of the spring members are relatively fixed, as well as to have vertical movement in relation thereto; the supports being preferably substantially S-shaped so as to afford yieldable movement forward and backward as well as vertically.

In the application and operation of the invention, a pair of the guard brackets 7 are provided, one being disposed on each member 6 and connecting with the bar 5 about midway between the longitudinal center and the ends thereof. By this arrangement spaced vertically extending guard members are provided, which project upwardly and downwardly from the bumper bar in such manner as to block the passage of bumper bars of other vehicles as before stated. The resilient members 9 and 10 form a spring support for the vertical guards and the bumper bar and operate to absorb shocks imposed thereon. By forming the vertical guards straight and connecting the supporting members 9 and 10 at substantially right angles thereto, the brackets will not tend to ride over or under obstructions abutting against the upper or lower portions thereof, and by rounding the rear portions of the member 9 and 10, adjacent to their intersection with the vertical portion 8, the brackets are adapted to be readily drawn over such obstructions as may be engaged rearwardly of the brackets. However, the brackets may be formed with any suitable shape to adapt them to perform the function for which they are designed, namely, to provide guards extending upwardly and downwardly from the bumper bar and capable of having yieldable movement.

We claim:

1. A bumper for vehicles comprising a horizontal bumper bar, a pair of upwardly and downwardly extending guards spaced apart on said bumper bar, resilient members extending rearwardly from the ends of said guards and projecting toward each other, and means for affixing the terminals of said resilient members to the vehicle.

2. A supporting bracket for vehicle bumpers comprising a vertically extending portion adapted to be affixed to a bumper bar and to project upwardly and downwardly therefrom, and rearwardly extending resilient members connecting with the ends of said vertical portion having their terminations located adjacent to each other.

3. A support for a bumper bar comprising a pair of substantially S-shaped resilient members adapted to be affixed to a vehicle and to project upwardly and downwardly therefrom, and a vertical guard connected at its upper and lower ends to said resilient members adapted to be affixed to a bumper bar.

In testimony whereof we have hereunto affixed our signatures this 9th day of January, 1920.

WILLIAM HENRY BOVARD.
EDWARD LAWTON BARKER.
CHARLES S. JENKINS.